United States Patent [19]
Thornton

[11] Patent Number: 5,171,408
[45] Date of Patent: Dec. 15, 1992

[54] ELECTROCHEMICAL MACHINING OF A TITANIUM ARTICLE

[75] Inventor: Roy F. Thornton, Schenectady, N.Y.

[73] Assignee: General Electric Company, Cincinnati, Ohio

[21] Appl. No.: 786,686

[22] Filed: Nov. 1, 1991

[51] Int. Cl.[5] .................. B23H 3/00; B23H 3/08; C22C 14/00

[52] U.S. Cl. .................. 204/129.1; 204/129.75; 420/418; 420/419; 420/421

[58] Field of Search ........... 204/129.1, 129.75, 129.25, 204/129.6; 420/417–419, 421

[56] References Cited

U.S. PATENT DOCUMENTS

| | | | |
|---|---|---|---|
| 3,245,891 | 4/1966 | Gary | 204/129.75 |
| 3,676,310 | 7/1972 | Wishnie | 204/129.1 |
| 3,753,878 | 8/1973 | Gosger | 204/129.1 |
| 3,873,512 | 3/1975 | Latanision | 204/129.25 X |
| 3,928,154 | 12/1975 | Andrews | 204/129.6 X |
| 4,452,677 | 6/1984 | Richardson | 204/129.1 |
| 4,975,125 | 12/1990 | Chakrabarti et al. | 420/418 X |
| 4,997,534 | 3/1991 | Thornton | 204/129.1 |

FOREIGN PATENT DOCUMENTS

| | | | |
|---|---|---|---|
| 2124935 | 11/1972 | Fed. Rep. of Germany . | |
| 0021506 | 2/1980 | Japan | 420/418 |
| 0324299 | 3/1972 | U.S.S.R. . | |
| 0473586 | 9/1975 | U.S.S.R. . | |
| 0703294 | 12/1979 | U.S.S.R. . | |
| 0904961 | 2/1982 | U.S.S.R. . | |
| 0916213 | 3/1982 | U.S.S.R. . | |

OTHER PUBLICATIONS

"Change in the Effective Valence of Titanium Dissolution in Halide–Nitrate Solutions", Elektronnaya Obrabotka Materialov, No. 1, 1989.
"The Role of Electrolyte in Electrochemical Machining of Titanium Alloys", Bulletin of Electrochemistry, Nov.–Dec. 1986.
"The Anodic Behaviour of Titanium Alloys During Electrochemical Precision Machining II. Two Component Aqueous Salt Solutions", Electrochem in Ind. Processing & Biol., 1983.
"Electrochemical Machining of Titanium Compressor Blades", IF(1) Journal-PR. vol. 68, Nov. 1987.
"On the Electrochemical Machining of Some Titanium Alloys in Bromide Electrolytes", Journal of Applied Electrochemistry, 1976.
"Electrochemical Machining", Journal of Applied Electrochemistry, 1977.
"Development of Electrolytes for the Electrochemical Machining of Titanium", Br. Corros. J., vol. 14 No. 4, 1979.
"Use of Methods Based on Experiment Planning Theory to Select the Electrolyte in Electrochemical Machining of Titanium Alloys TS-5", Sov. Surf, Eng. & Appl. Electrochem. V. 2, 1973.
"Kinetics of Anodic Dissolution of Titanium Alloys at High Current Densities", Electrochem. in Ind. Processing and Biol. No. 3, 1982.

*Primary Examiner*—Donald R. Valentine
*Attorney, Agent, or Firm*—Jerome C. Squillaro; Carmen Santa Maria

[57] ABSTRACT

The titanium alloy T1 17, having a nominal composition of about 5 weight percent aluminum, about 2 weight percent zirconium, about 2 weight percent tin, about 4 weight percent molybdenum, about 4 weight percent chromium, no more than about 1.1 percent of other elements, and balance titanium, is electrochemically machined using an electrolyte comprising an aqueous solution of from about 0.94 to about 1.16 moles per liter of bromide anion and from about 0.09 to about 0.55 moles per liter of sodium nitrate.

12 Claims, 1 Drawing Sheet

ELECTROCHEMICAL MACHINING OF A TITANIUM ARTICLE

BACKGROUND OF THE INVENTION

This invention relates to metal removal from a titanium alloy article, and, more particularly, to the electrochemical machining of a titanium alloy article made of the titanium alloy Ti 17.

Electrochemical machining is a technique for removing metal from a metallic article, and in concept is roughly the inverse of electroplating. In electrochemical machining (or "ECM"), a workpiece is made the anode of an electrolytic cell having a cathode in the shape of a metalworking tool and an electrolyte. The electrolyte is a fluid, typically an aqueous solution of various ionic species, that carries the electrical current of the cell between the anode and the cathode. When an electric current is passed through the cell, metal is dissolved from the workpiece in a pattern dictated by the shape of the cathode.

Electrochemical machining is usually conducted with high electrical current densities of up to several hundred amperes per square inch. The spacing between the anode and the cathode is small, usually 0.1 to 1.5 millimeters, or even less. The electrolyte is pumped through the space between the anode and the cathode at high flow rates and pressures, to carry away heat, gas bubbles, and dissolved metallic species from the anode.

Under these conditions, metal removal is fast but must also be uniform. For metallic articles to be used in precision applications such as aerospace hardware, the surface finish of the article must be very smooth, on the order of 25 microinches or less variation. The surface must be free of macroscopic defects such as ridges, pitting, flow patterns, etched appearance, or visible patterns.

Some metals are particularly difficult to electrochemically machine at high rates of metal removal, while attaining a good surface finish. One commercially important example is titanium and titanium alloys (generally termed "titanium" herein). Titanium forms an oxide surface layer, both in normal exposure and during electrochemical machining. The oxide passive coating must be removed, requiring the use of chemically aggressive electrolytes. Although a number of electrolytes can be used to remove titanium from an article by electrochemical machining, these known electrolytes often lead to surface irregularities of the type discussed. Where there are ridges, pits, and other defects formed on the electrochemically machined surface, expensive post-machining polishing and/or repairs may be necessary.

There is a need for an improved approach to the electrochemical machining of titanium alloys, and in particular the titanium alloy Ti 17. Different titanium alloys respond differently to ECM, and therefore an electrolyte that is operable for one titanium alloy would typically not be operable for another titanium alloy. Thus, there is needed an electrolyte that is custom tailored for ECM of Ti 17 alloy. The present invention fulfills this need, and further provides related advantages.

SUMMARY OF THE INVENTION

The present invention provides an approach for the electrochemical machining of titanium, particularly the titanium alloy Ti 17. A Ti 17 titanium alloy article can be rapidly shaped by electrochemical machining, with an excellent surface finish that meets the requirements for critical applications. The invention utilizes a modified electrolyte chemistry that does not add substantially to the cost of the machined part.

In accordance with the invention, a process for electrochemically machining an article made of a titanium alloy comprises the steps of furnishing an article made of a titanium alloy having a composition, in weight percent, of from about 4.5 to about 5.5 percent aluminum, from about 1.5 to about 2.5 percent zirconium, from about 1.5 to about 2.5 percent tin, from about 3.5 to about 4.5 percent molybdenum, from about 3.5 to about 4.5 percent chromium, no more than about 1.1 percent of other elements, balance titanium. The titanium article is electrochemically machined in an electrolyte comprising an aqueous solution of from about 0.94 to about 1.16 moles of bromide anion and from about 0.09 to about 0.55 moles of nitrate anion per liter of solution. Preferably, the nitrate ion concentration is from about 0.29 to about 0.49 moles per liter of solution.

A nominal composition of the Ti 17 alloy has about 5 weight percent aluminum, about 2 weight percent zirconium, about 2 weight percent tin, about 4 weight percent molybdenum, and about 4 weight percent chromium.

The bromide anion is preferably furnished in sodium bromide, and the nitrate anion is preferably furnished in sodium nitrate. Sodium bromide in an amount of from about 97 to about 119 grams per liter of solution furnishes from about 0.94 to about 1.16 moles of bromide anion per liter of solution. Sodium nitrate in an amount of from about 8 to about 47 grams per liter of solution furnishes from about 0.09 to about 0.55 moles of nitrate anion per liter of solution. However, the effect of the cation is relatively small, and various other sources of bromide anion and nitrate anion can be used.

When the electrolyte of the invention is used to electrochemically machine pieces of Ti 17 alloy, at current densities of about 200 amperes per square inch and greater, the resulting parts have a surface finish of less than about 25 microinches. The surfaces are smooth and regular when viewed at magnifications of 1× to about 60×, without ridges, pits, flow lines, or other visible defects. As-cut surfaces are covered with a powdery gray layer that can be removed with a bristle brush. The underlying surface is metallic with a matte finish. These parts are suitable for most aircraft engine applications. By contrast, and as will be discussed in more details, pieces machined using other electrolytes and similar operating conditions do not meet the surface finish requirements.

The electrolyte of the invention can also be used to electrochemically machine pieces of Ti 17 alloy at current densities of less than about 200 amperes per square inch, as is sometimes required in particular machining operations. The surface finish is not quite as good as obtained at the higher current densities, but is superior to that attained with other electrolytes tested.

The present invention provides an advance in the electrochemical machining of titanium alloys, and in particular Ti 17. Other features and advantages will be apparent from the following more-detailed description of the preferred embodiments, taken in conjunction with the accompanying drawing, which illustrates, by way of example, the principles of the invention.

DETAILED DESCRIPTION OF THE PREFERRED EMBODIMENTS

Figure 1:
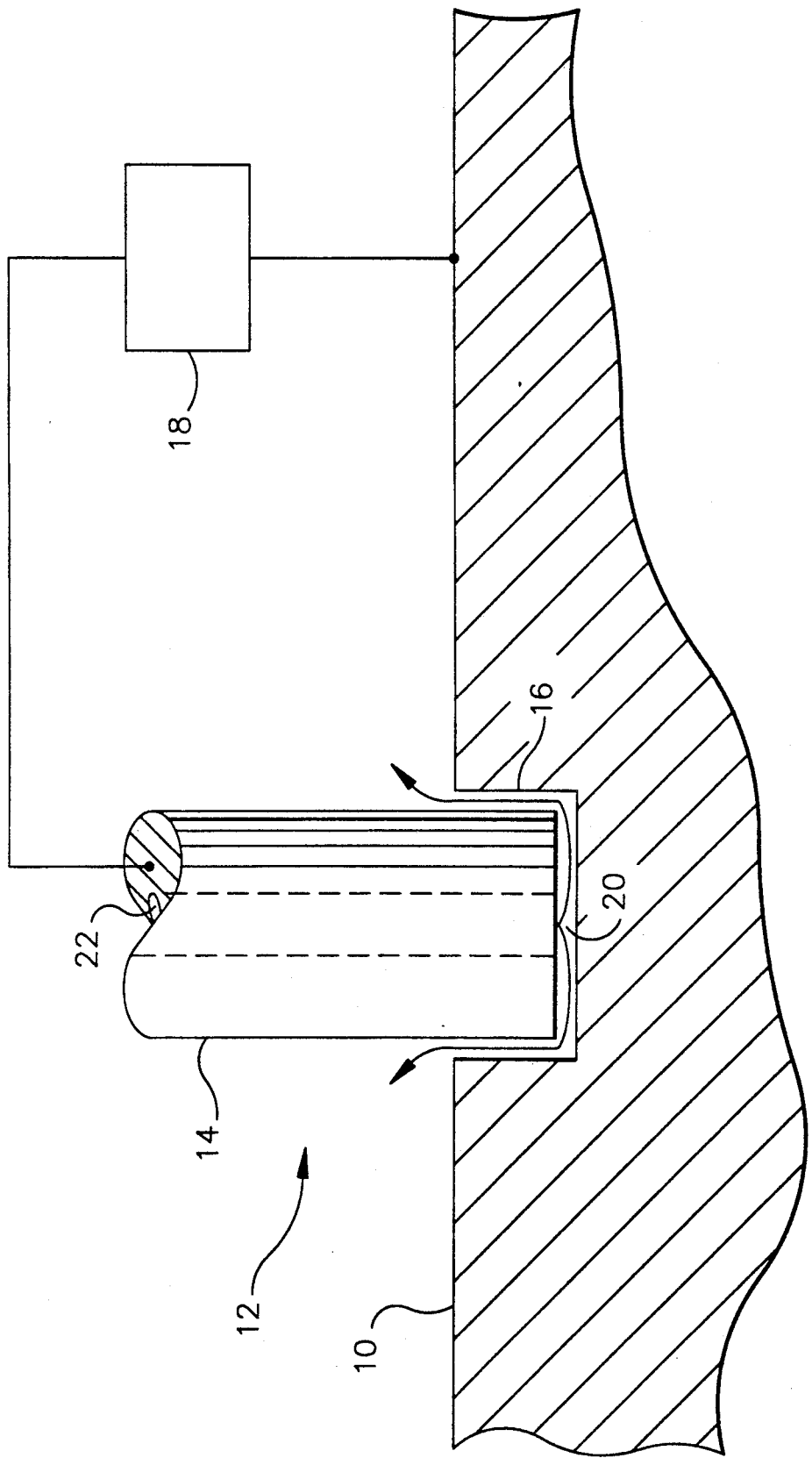
FIG. 1 is a schematic side elevational view of an electrochemical machining process, with a portion shown in section.

FIG. 1 is a view of a titanium article 10 being electrochemically machined. The article 10 is the anode of an electrochemical cell 12. A cathode 14 is a shaped metal piece having the form of the desired machined surface shape. For example, in FIG. 1 the cathode 14 is a hollow cylindrical rod suitable for machining a cylindrical hole 16 in the article 10. A voltage/current source 18 provides a controlled voltage or current as required by the particular process, and is connected so that the article 10 is the anode.

A liquid electrolyte 20 is disposed between the cathode 14 and the article (anode) 10. In a commercial application of electrochemical machining, the rate of metal removal and heat generation is so rapid that the electrolyte 20 is continuously flowed past the locations of metal removal, the hole 16 in the illustrated example. A convenient approach to providing a flowing electrolyte is to pass the flow of electrolyte through a bore 22 in the cathode 14, out of the cathode into the area being electrochemically machined, here the hole 16, and then away to be recovered, cleaned, and, in most cases, reused.

The preferred electrolyte of the invention is an aqueous solution containing from about 0.94 to about 1.16 moles (i.e., from about 97 to about 119 grams) of sodium bromide per liter of solution and from about 0.09 to about 0.55, preferably from about 0.29 to about 0.46, moles (i.e., from about 8 to about 47, preferably from about 25 to about 39, grams) of sodium nitrate per liter of solution. If less sodium bromide is used, the conductivity of the electrolyte is decreased so that the power requirement is raised or the rate of metal removal is reduced. If more sodium bromide is used, the surface finish is unacceptably rough and there is strong etching, inasmuch as the bromide ion is very aggressive in attacking the titanium alloy. If less or more sodium nitrate than indicated is used, the surface becomes unacceptably rough and the results become very sensitive to electrochemical operating parameters such as current density and electrolyte flow rate. The preferred range of sodium nitrate, from about 0.09 to about 0.55 moles per liter of solution, produces particularly good results over a range of current densities, and the results are relatively insensitive to electrolyte flow rate. This lack of sensitivity to current density and electrolyte flow rate is highly desirable in a commercial application, because irregularities in the machined geometry can cause variations in the current density that in turn can produce unacceptable final results.

Another important feature of the present electrolyte is that it exhibits acceptably low voltage losses relative to the theoretical titanium dissolution potential of about 3.5–4.0 volts. Sodium bromide solutions (without any sodium nitrate added) had similar voltage losses, but the resulting surfaces were unacceptably rough. The titanium alloy could not be electrochemically machined in sodium nitrate solution alone, due to passivation effects. When sodium chloride solution was used as the electrolyte, the voltage loss was unacceptably high at about 8.5 volts positive compared to the theoretical dissolution voltage, and there was considerable variation of the character of the surface from place to place.

A series of studies was performed to determine the acceptable range of compositions of the electrolyte. A cell having a cylindrical cathode was used, with the area of the cathode 0.0123 square inches. The electrolyte flowed past the anode rather than through the cathode. The workpiece anode or article 10 was a piece of flat Ti 17 alloy having a composition in weight percent of 5 weight percent aluminum, 2 weight percent zirconium, 2 weight percent tin, 4 weight percent molybdenum, about 4 weight percent chromium, minor amounts of conventional impurities, balance titanium. The flow rate of electrolyte was either 1.2 or 1.8 liters per minute in this cell. Current densities were 80, 160, 320, or 480 amperes per square inch. After the electrochemical machining was complete, the roughness of the surface was measured in microinches using a profilometer, and the selection of acceptable electrolyte compositions was based upon the average surface roughness value for 160 and 320 amperes per square inch current density. Each electrochemically machined region was also examined at 1× magnification, and also through a microscope in the range of 14–60× magnification to determine the presence of irregularities.

The following Table 1 presents the results of these studies. In this table, the electrolyte composition is given in terms of the solute and its concentration in grams per liter of solution (g/l). To conserve space in the table, sodium bromide is indicated as "bromide" and sodium nitrate is indicated as "nitrate". The electrolyte flow rate in liters of solution per minute (l/min) and surface finishes in microinches (micro-in), and current densities in amperes per square inch are indicated. The average (Avg.) value is for the average of the surface finish measurements for current densities of 160 and 320 amperes per square inch. After some values of the surface finish, observations of unacceptable features on the surfaces are indicated, where "r" indicates the presence of ridges perpendicular to the flow direction of the electrolyte, and "s" indicates slight ridging.

TABLE 1

| Electrolyte Comp (g/l) | flow l/min | Surf. Fin. micro-in At current den. | | | | |
|---|---|---|---|---|---|---|
| | | 80 | 160 | 320 | 480 | Avg. |
| bromide, 412 | 1.8 | | 75 | 40 | | 58 |
| | 1.2 | 200+ | 87 | 46 | 28 | 66 |
| bromide, 119 | 1.8 | | 98r | 43r | | 70 |
| | 1.2 | 59 | 41 | 30 | 31 | 36 |
| bromide, 108 | 1.8 | | 69r | 40r | | 54 |
| | 1.2 | 66 | 45 | 27 | 22 | 36 |
| bromide, 97 | 1.8 | | 60r | 39r | | 50 |
| | 1.2 | 60 | 49 | 30 | 22 | 40 |
| bromide, 54 | 1.8 | 67r | 59r | 43r | | 51 |
| bromide, 130; nitrate, 17 | 1.8 | | 45s | 34s | | 40 |
| | 1.2 | 48 | 43 | 37 | 32 | 40 |
| bromide, 119; nitrate, 34 | 1.8 | | 29 | 25 | | 27 |
| | 1.2 | 45 | 30 | 23 | 21 | 26 |
| bromide, 108; nitrate, 68 | 1.8 | | 59 | 40 | | 50 |
| | 1.2 | 200+ | 61 | 43 | 38 | 52 |
| bromide, 108; nitrate, 51 | 1.8 | | 60 | 32 | | 46 |
| | 1.2 | 70 | 65 | 26 | 14 | 46 |
| bromide, 108; nitrate, 47 | 1.8 | | 45 | 22 | | 34 |
| | 1.2 | 64 | 50 | 21 | 17 | 36 |
| bromide, 108; nitrate, 42 | 1.8 | | 49 | 19 | | 34 |
| | 1.2 | 60 | 36 | 20 | 16 | 28 |
| bromide, 108; nitrate, 38 | 1.8 | | 29 | 18 | | 24 |
| | 1.2 | 49 | 27 | 20 | 16 | 24 |
| bromide, 108; nitrate, 34 | 1.8 | | 28 | 23 | | 26 |
| | 1.2 | 51 | 30 | 23 | 20 | 26 |
| bromide, 108; nitrate, 25 | 1.8 | | 29 | 20 | | 24 |
| | 1.2 | 47 | 29 | 24 | 29 | 26 |

TABLE 1-continued

| Electrolyte Comp (g/l) | flow l/min | Surf. Fin. micro-in At current den. | | | | Avg. |
|---|---|---|---|---|---|---|
| | | 80 | 160 | 320 | 480 | |
| bromide, 108; nitrate, 22 | 1.8 | 47s | 39s | 36 | | 38 |
| bromide, 108; nitrate, 17 | 1.8 | | 39 | 32 | | 36 |
| | 1.2 | 48 | 37 | | 28 | |
| bromide, 108; nitrate, 9 | 1.8 | | 36s | 27s | | 32 |
| | 1.2 | 62 | 41 | 24 | 30 | 32 |
| bromide, 97; nitrate, 34 | 1.8 | | 26 | 20 | | 23 |
| | 1.2 | 49 | 34 | 22 | 19 | 28 |

Based upon these results, the acceptable range of electrolyte composition was selected as from about 97 to about 119 grams of sodium bromide per liter of solution, and from about 8 to about 47 grams of sodium nitrate per liter of solution. A preferred range of sodium nitrate, that produced the best results over a range of operating conditions, was from about 25 to about 39 grams per liter of solution.

Scale-up of the approach of the invention was verified in an apparatus similar to that of FIG. 1, using a cathode 14 having an active frontal area of about 2.2 square inches. Current densities from 96 to 556 amperes per square centimeter were utilized, and the results are as follows:

TABLE 2

| Current Density (amperes per square inch) | Surface Finish (microinches AA) |
|---|---|
| 96 | 40 |
| 198 | 35 |
| 390 | 11 |
| 556 | 16 |

Another set of tests was performed using different combinations of electrolytes in the apparatus used to produce the test results of Table 1, and the results are reported in Table 3. Abbreviations in Table 3 are generally the same as in Table 1, with the following additions. Sodium chloride is indicated as "chloride", lithium chloride is indicated as "LiCl", sodium fluoride is indicated as "fluoride", disodium phosphate is indicated as "DSP", sodium iodide is indicated as "iodide", sodium nitrite is indicated as "nitrite", ammonium nitrate is indicated as "Amm.Nit.", ammonium bromide is indicated as "Amm.Bro.", and sodium bromate is indicated as "bromate". In Table 3, "r" and "s" have the same meaning as in Table 1. Additionally, a variety of other defects were noted, including the presence of dull grey patches, regions of etched appearance, uneven surface, wavy surface, projections, and other defects. In Table 3, these other types of defects that render the surface unacceptable, are indicated as "d".

TABLE 3

| Electrolyte Comp (g/l) | flow l/min | Surf. Fin. micro-in At current den. | | | | Avg. |
|---|---|---|---|---|---|---|
| | | 80 | 160 | 320 | 480 | |
| chloride, 300 | 1.8 | | 80 | 35d | | 58 |
| | 1.2 | 32 | 54 | 40 | 40 | 47 |
| chloride, 72; LiCl, 13 | 1.8 | d | | d | | |
| chloride, 132; fluoride, 4 | 1.8 | 90d | 32d | 27d | | 30 |
| chloride, 90; fluoride, 4 | 1.8 | 62d | 15d | 27d | | 21 |
| chloride, 90; fluoride, 8 | 1.8 | 42d | 38d | 15d | | 26 |
| chloride, 90; fluoride, 4; DSP, 14 | 1.8 | d | d | d | | |

TABLE 3-continued

| Electrolyte Comp (g/l) | flow l/min | Surf. Fin. micro-in At current den. | | | | Avg. |
|---|---|---|---|---|---|---|
| | | 80 | 160 | 320 | 480 | |
| chloride, 90, fluoride, 4; bromide, 10 | 1.8 | 82d | 73d | 45d | | 59 |
| chloride, 90; bromide, 10 | 1.8 | | 85d | 64d | | 74 |
| | 1.2 | 93d | 84d | 61d | 32d | 72 |
| chloride, 59; bromide, 103; fluoride, 7 | 1.8 | 88d | 47d | 25 | | 36 |
| chloride, 48; bromide, 60; fluoride, 2 | 1.8 | 83d | 68d | 54s | | 61 |
| chloride, 90; iodide, 15 | 1.8 | 36 | 27d | 31d | | 29 |
| | 1.2 | 48d | 24d | 28d | 19d | 26 |
| chloride, 90; nitrite, 7 | 1.8 | 65d | 41d | 40 | | 40 |
| bromide, 108; chloride, 24; nitrate, 8 | 1.8 | | 44r | 49s | | 46 |
| | 1.2 | 52 | 48 | 38 | 32 | 43 |
| bromide, 108; chloride, 6; nitrate, 8 | 1.8 | 46 | 34s | 40r | | 37 |
| bromide, 108; nitrate, 8; nitrite, 7 | 1.8 | | 41r | 48r | | 44 |
| | 1.2 | 61 | 43 | 32s | 24 | 38 |
| bromide, 108; nitrite, 28 | 1.8 | | r | r | | |
| | 1.2 | r | r | r | r | |
| bromide, 108; Amm. Nit., 17 | 1.8 | | 32 | 27 | | 30 |
| | 1.2 | 56 | 35 | 32s | 28s | 34 |
| bromide, 108; nitrate, 17; nitrite, 14 | 1.8 | | 48s | 33s | | 40 |
| | 1.2 | 69 | 44 | 33 | 29 | 38 |
| bromide, 108; nitrite, 7 | 1.8 | 52 | 65r | 30r | | 48 |
| bromide, 98; Amm. Bro., 10 | 1.8 | 48 | 80r | 33r | | 56 |
| bromide, 154; fluoride, 4 | 1.8 | 57 | 66r | 34r | 23r | 50 |
| bromide, 130; fluoride, 6 | 1.8 | 56 | 81r | 22r | 19r | 52 |
| bromide, 119; fluoride, 4 | 1.8 | 86s | 95r | 34r | 27r | 64 |
| | 1.2 | | 48 | | | |
| bromide, 113; fluoride, 5 | 1.8 | 75 | 88r | 37r | 22r | 62 |
| | 1.2 | | 43 | | | |
| bromide, 113; fluoride, 6 | 1.2 | 61 | 43 | 30 | 27 | 36 |
| bromide, 108; fluoride, 3 | 1.8 | 68 | 54r | 32r | 23r | 43 |
| bromide, 108; fluoride, 4 | 1.8 | 56r | 38r | 28r | 20r | 33 |
| bromide, 108; fluoride, 6 | 1.8 | 52r | 32r | 28r | 21r | 30 |
| | 1.2 | 63 | 45 | 30s | 30 | 38 |
| bromide, 108; fluoride, 9 | 1.8 | 47 | 51r | 28r | 18s | 40 |
| bromide, 108; fluoride, <24 | 1.8 | 57 | 35r | 23 | 18 | 29 |
| bromide, 103; fluoride, 5 | 1.8 | 61 | 82r | 34r | 19r | 58 |
| | 1.2 | | 44 | | | |
| bromide, 103; fluoride, 6 | 1.2 | 62 | 40 | 26s | 24s | 33 |
| bromide, 97; fluoride, 4 | 1.8 | 60 | 56r | 28r | 38r | 42 |
| | 1.2 | | 41 | | | |
| bromide, 97; fluoride, 6 | 1.8 | 60 | 57r | 30r | 23r | 44 |
| bromide, 90; fluoride, 4 | 1.8 | 53r | 62r | 24r | 23r | 43 |
| bromide, 54; fluoride, 4 | 1.8 | 57 | 42s | 23s | | 32 |
| bromide, 108; fluoride, 4; nitrate, 9 | 1.8 | 49 | 47s | 30r | 22r | 38 |
| bromide, 108; fluoride, <24; nitrate, 9 | 1.8 | 43 | 38 | 32r | 23 | 35 |
| bromide, 108; bromate, 60 | 1.8 | | 57d | | | |
| bromide, 108; bromate, 15 | 1.8 | | 54 | | | |

These results demonstrate that no other electrolyte investigated produced results as good as those obtained with the aqueous solutions of bromide and nitrate anions of the invention.

The present invention provides an advance in the art of electrochemical machining, by providing a titanium electrolyte that yields excellent results. Although the present invention has been described in connection with specific examples and embodiments, it will be understood by those skilled in the arts involved, that the present invention is capable of modification without departing from its spirit and scope as represented by the appended claims.

What is claimed is:

1. A process for electrochemically machining an article made of a titanium alloy, comprising the steps of:
   furnishing an article made of a titanium alloy having a composition, in weight percent, of from about 4.5 to about 5.5 percent aluminum, from about 1.5 to about 2.5 percent zirconium, from about 1.5 to about 2.5 percent tin, from about 3.5 to about 4.5 percent molybdenum, from about 3.5 to about 4.5 percent chromium, no more than about 1.1 percent of other elements, balance titanium; and
   electrochemically machining the titanium alloy in an electrolyte comprising an aqueous solution of from about 0.94 to about 1.16 moles per liter of bromide anion and from about 0.09 to about 0.55 moles per liter of nitrate anion.

2. The process of claim 1, wherein the electrochemical machining current density is greater than about 200 amperes per square inch.

3. The process of claim 1, wherein the electrolyte has from about 0.29 to about 0.46 moles per liter of nitrate anion.

4. The process of claim 1, wherein the bromide anion is furnished in the form of sodium bromide.

5. The process of claim 1, wherein the nitrate anion is furnished in the form of sodium nitrate.

6. The process of claim 1, wherein the titanium alloy has about 5 weight percent aluminum, about 2 weight percent zirconium, about 2 weight percent tin, about 4 weight percent molybdenum, and about 4 weight percent chromium.

7. An electrochemically machined titanium article prepared by the process of claim 1.

8. A process for electrochemically machining an article made of a titanium alloy, comprising the steps of:
   furnishing an article made of a titanium alloy having a composition, in weight percent, of from about 4.5 to about 5.5 percent aluminum, from about 1.5 to about 2.5 percent zirconium, from about 1.5 to about 2.5 percent tin, from about 3.5 to about 4.5 percent molybdenum, from about 3.5 to about 4.5 percent chromium, no more than about 1.1 percent of other elements, balance titanium;
   making the article the anode in an electrolytic cell, the electrolytic cell having an electrolyte comprising an aqueous solution of from about 0.94 to about 1.16 moles per liter of sodium bromide and from about 0.09 to about 0.55 moles per liter of sodium nitrate; and
   passing an electrical current from a cathode through the electrolyte and the anode, thereby removing material from the anode.

9. The process of claim 8, wherein the electrochemical machining current density is greater than about 200 amperes per square inch.

10. The process of claim 8, wherein the electrolyte has from about 0.29 to about 0.46 moles per liter of sodium nitrate.

11. The process of claim 8, wherein the titanium alloy has about 5 weight percent aluminum, about 2 weight percent zirconium, about 2 weight percent tin, about 4 weight percent molybdenum, and about 4 weight percent chromium.

12. An electrochemically machined titanium article prepared by the process of claim 8.

* * * * *